United States Patent
Kinoshita (12) 
(10) Patent No.: US 6,232,748 B1
(45) Date of Patent: May 15, 2001

(54) BATTERY CONTROL APPARATUS FOR HYBRID VEHICLE

(75) Inventor: Naoki Kinoshita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,768

(22) Filed: Aug. 24, 2000

(30) Foreign Application Priority Data

Aug. 27, 1999 (JP) .................................................. 11-242354

(51) Int. Cl.$^7$ .................................................. H01M 10/46
(52) U.S. Cl. ........................................... 320/132; 320/150
(58) Field of Search ..................................... 320/104, 123, 320/132, 150, 153; 324/426, 427, 431, 433

(56) References Cited

U.S. PATENT DOCUMENTS 5,412,307 * 5/1995 Yoshimatsu .
5,614,804 * 3/1997 Kayano et al. .

* cited by examiner

*Primary Examiner*—Edward H. Tso
(74) *Attorney, Agent, or Firm*—Arent Fox Kintner Plotkin & Kahn, PLLC (57) ABSTRACT

The present invention relates a battery control apparatus (9) controls charge/discharge processes of a battery (8) installed in a hybrid vehicle, according to the battery temperature so as to prevent degradation of the battery performance. The vehicle has a combustion engine (1) for providing a driving force, an electric motor (2) for generating a drive assist force for assisting the output of the engine, wherein the battery supplies electrical power to the motor, and, when the drive-assist force is not required by the engine, the motor is used as a generator to charged the battery, the apparatus is comprised by: a residual battery charge computation device (91) for computing a level of residual battery charge in the battery; a battery temperature measuring device for measuring a temperature of the battery; and a charge/discharge controller (92) that operates in such a way that, when a battery temperature measured by the battery temperature measuring device exceeds a threshold temperature, the charge/discharge controller permits only discharging until the residual battery charge is lowered to a level defined by a first specified value.

3 Claims, 6 Drawing Sheets

BATTERY CONTROL APPARATUS FOR HYBRID VEHICLE

BACKGROUND OF THE INVENTION

1. Field of the Invention

The present invention relates to a battery control apparatus for controlling the battery installed in a hybrid vehicle, and relates in particular to a battery control apparatus to control charging or discharging amount according to the temperature of the battery.

2. Description of the Related Art

Conventionally, hybrid vehicles that carry a separate motor in addition to a drive engine as a power source are known. Hybrid vehicles are divided into a series-hybrid type and a parallel-hybrid type. The series-hybrid type vehicles in which the engine drives a generator that outputs electric power to operate the motor to drive the wheels.

Therefore, because the engine and the wheels are not linked, the engine can be operated at roughly a constant speed in a range of rotational speed to produce high fuel cost but low emission, so that better fuel cost and lower emission can be achieved compared with the conventional engine-driven vehicles.

In contrast, the parallel-hybrid vehicles in which a motor linked mechanically to the drive engine is used to assist the rotation of the drive shaft of the engine as well as to charge a storage battery using the same motor as a generator to store electrical charges in the battery, and the generated electricity is used also for electrical devices in the vehicle.

Therefore, in spite of the fact that the engine is linked to the wheels, the load on the engine can be reduced so that this type of vehicles can also achieve better low fuel cost and lower emission.

In the parallel-hybrid vehicles, there is a type in which the motor is connected directly to the output shaft of the engine, and the motor functions as the generator to charge the battery during deceleration of the vehicle, and another type in which either or both the engine and the motor are able to generate drive power, and a generator is provided separately.

In such hybrid vehicles, the demand of the driver can be met by having the motor assisting the output of the engine during the acceleration stage, or by having the motor charging the battery during the deceleration stage of the vehicle, due to "deceleration regeneration", for example, so that the electrical energy of the battery (referred to as the residual battery charge, hereinafter) can be maintained.

However, the battery used for hybrid vehicles exhibit a property that charging efficiency is rapidly lowered beyond a certain temperature. This temperature is dependent on the characteristics of the battery. If charging is continued when the battery is at a temperature higher than such a temperature, the charging energy is converted to heat and cannot be stored in the battery as electrical energy.

Further, if the battery is comprised by a number of modules, the capacity of each module can vary if the temperatures of the modules are not uniform. Variations in the module temperature can occur particularly easily when the battery temperature increases due to the effects of surrounding temperatures. Furthermore, when the battery temperature is high, it becomes difficult to detect the high-limit of residual battery charge, because of decrease in changes in the battery voltage required to detect the residual charge upper limit. For this reason, batteries in hybrid vehicles are often provided with a cooling facility for cooling the batteries so as to maintain the battery temperature below a transition temperature that charging efficiency is rapidly lowered.

However, the cooling facility can only function during the vehicle is motion, and therefore, when the vehicle is stationary, battery alone cannot be cooled. For this reason, the battery installed in the interior of the vehicle under the burning sun raises its temperature as the surrounding temperature rises. Under such a condition, even when the battery is cooled by moving the vehicle, it takes time to cool the battery temperature to less than the transition temperature. So long as the battery temperature remains high, charging does not produce storage of electrical energy in the battery so that it leads to a problem that the battery temperature can further increase.

Also, if charging or discharging is performed regarding that the temperature of the modules comprising the battery are uniform, though there are variations in the temperature of the modules, differences in the battery capacity can increase even more. Also, if charging is carried out while the battery is still at some high temperature, because the energy is transformed to heat and the battery voltage would not rise, it is difficult to detect the high-limit of residual battery charge from the change of the battery voltage, which leads to a problem of over-charging and degradation of the battery.

It is, therefore, an object of the present invention to provide an apparatus to control charge/discharge process of the battery dependent upon the temperature of the battery so as to prevent degradation of the battery.

SUMMARY OF THE INVENTION

The first aspect of the invention relates to an apparatus for controlling a battery installed in a hybrid vehicle having a combustion engine (engine 1 for example) for providing a driving force, an electric motor (motor 2 for example) for generating a drive-assist force for assisting the output of the engine, wherein the battery (battery 8 for example) supplies electrical power to the motor, and, when the drive-assist force is not required by the engine, the motor is used as a generator to charged the battery, the apparatus is comprised by: a residual battery charge computation device (residual battery charge computation device 91 for example) for computing a level of residual battery charge in the battery; a battery temperature measuring device (temperature sensor in the example) for measuring a temperature of the battery; and a charge/discharge controller (charge/discharge control section 92 for example) that operates in such a way that, when a battery temperature measured by the battery temperature measuring device exceeds a specific temperature (the threshold temperature at which the charging efficiency decreases noticeably, for example, and the battery 8 meets conditions described in steps S1 and S2), the charge/discharge controller permits only discharging until the residual battery charge is lowered to a level defined by a first specified value (use-permitted low-limit of the residual charge, for example).

According to the first aspect of the invention, because the apparatus is provided with a residual battery charge computation device for computing a level of residual battery charge in the battery; a battery temperature measuring device for measuring a temperature of the battery; and a charge/discharge controller that operates in such a way that, when a battery temperature measured by the battery temperature measuring device is a threshold temperature that begins lowering of charging efficiency, the charge/discharge controller does not permit charging but permits only discharging until the residual battery charge is lowered to the use-permitted low-limit, so that, when the battery temperature is high, charging is not permitted until the battery temperature decreases, thereby preventing further increase in the battery temperature and degradation of the battery that are caused by low charging efficiency.

A second aspect of the invention relates to the apparatus, wherein, after the battery has reached the first specified value of residual battery charge (use-permitted low-limit of the residual charge, for example), the charge/discharge controller permits the battery to be charged to a level not exceeding a level defined by a second specific value (charge-permitted restriction value, for example) of the residual battery charge, which is higher than the first specified value of the residual battery charge (as described in steps S5, S7, for example).

According to the second aspect of the invention, after the battery has been discharged to a state that the battery voltage is below the use-permitted low-limit of the residual charge, charging in excess of the charge-permitted restriction value is forbidden until the battery temperature becomes lower than the threshold temperature, and charging is permitted only within a range to prevent degradation of the battery, while the battery temperature is high, thereby restricting the residual battery charge to remain at a low value and enabling to store the regenerated energy efficiently.

A third aspect of the invention relates to the apparatus, wherein the residual battery charge computation device determines whether a battery voltage is at a lower limit of battery voltage (as described in steps S11, 12, for example), and defines the detected lower limit of battery voltage as representing the use-permitted low-limit of the residual battery charge of the battery (as described in step S19, for example).

According to the third aspect of the invention, because a detected lower limit of battery voltage is used to represent the use-permitted low-limit of the residual charge, integration error caused by integration of charge/discharge current can be eliminated so that the precision of determining the use-permitted low-limit of the residual battery charge is improved.

DESCRIPTION OF THE PREFERRED EMBODIMENTS

A preferred embodiment of the apparatus for controlling charging/discharging of a battery for hybrid vehicle will be presented in the following with reference to the drawings.

Figure 1:
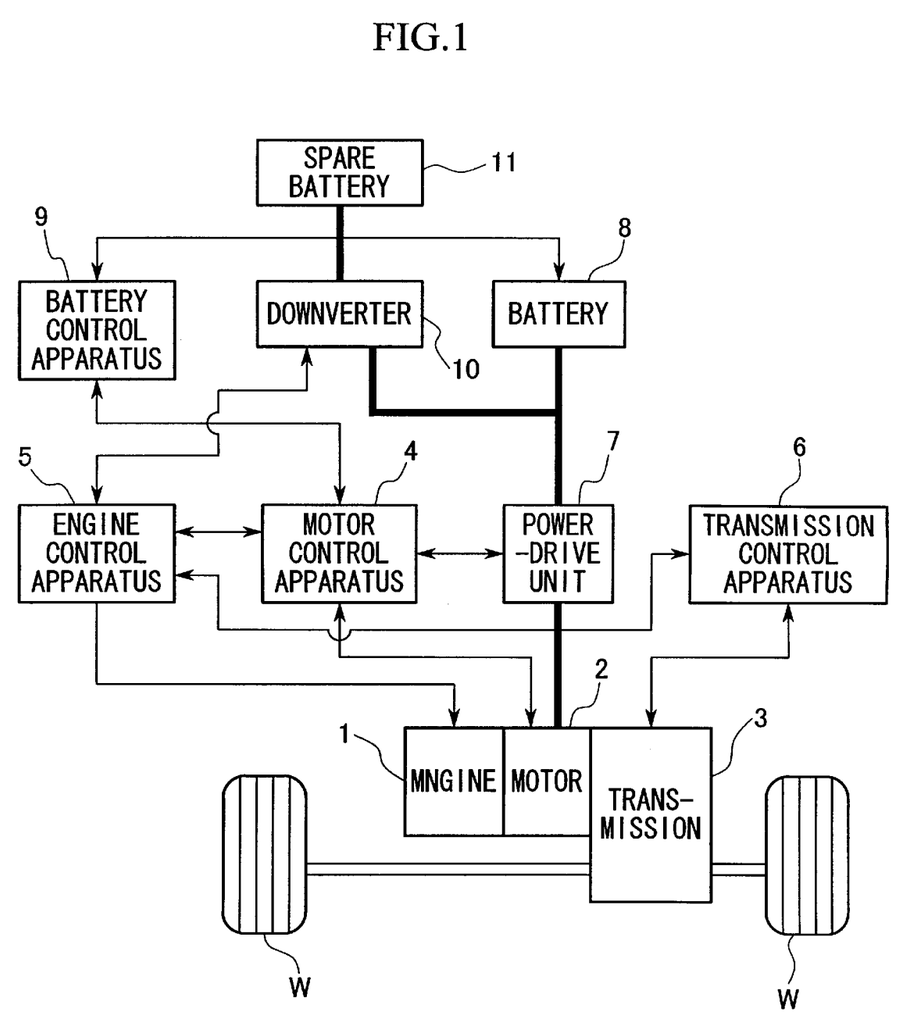
FIG. 1 is an overall schematic diagram of a hybrid vehicle.

FIG. 1 shows a block diagram of the overall configuration of the apparatus. In this diagram, a reference numeral 1 relates to an internal combustion engine, which will be referred to as the engine hereinbelow, and it is shown as "engine" in the drawings. A reference numeral 2 relates to an electric motor, and will be referred to as the motor hereinbelow, and it is shown as "motor" in the drawings. The motor 2 is used to assist the output of the engine, depending on the operating condition of the vehicle, and is used to regenerate power during the deceleration stage of the vehicle. A reference numeral 3 relates to a transmission mechanism, and is either a manual transmission or an automatic transmission. Also, the transmission 3 includes a clutch or a torque converter, forward/reverse switching mechanism, variable speed mechanism and differential gears. The drive power of the engine 1 and the motor 2 is transmitted to drive wheels W by the transmission 3.

A reference numeral 4 relates to a motor control apparatus for controlling the revolution of the motor 2; 5 relates to an engine control apparatus for controlling the operation of the engine 1; 6 relates to a transmission control apparatus for controlling the operation of the transmission 3; 7 relates to the power drive unit for input/output of electrical power of motor 2 according to control signals from the motor control apparatus 4; 8 relates to a battery of a high voltage type, comprised by connecting a number of modules, for supplying electrical power to motor 2 and stores regenerated energy produced by the regeneration operation of motor 2 when the drive power for engine 1 is not required; 9 relates to a battery control apparatus for monitoring the performance of the battery 8 and controlling the charging/discharging of the battery based on its performance; 10 relates to a downverter for lowering the voltage of the battery 8 and outputting the lowered voltage; and 11 relates to a spare battery of a 12-volt type for supplying power to electrical devices in the vehicle. The spare battery 11 is charged by the battery 8 through the downverter 10.

Figure 2:
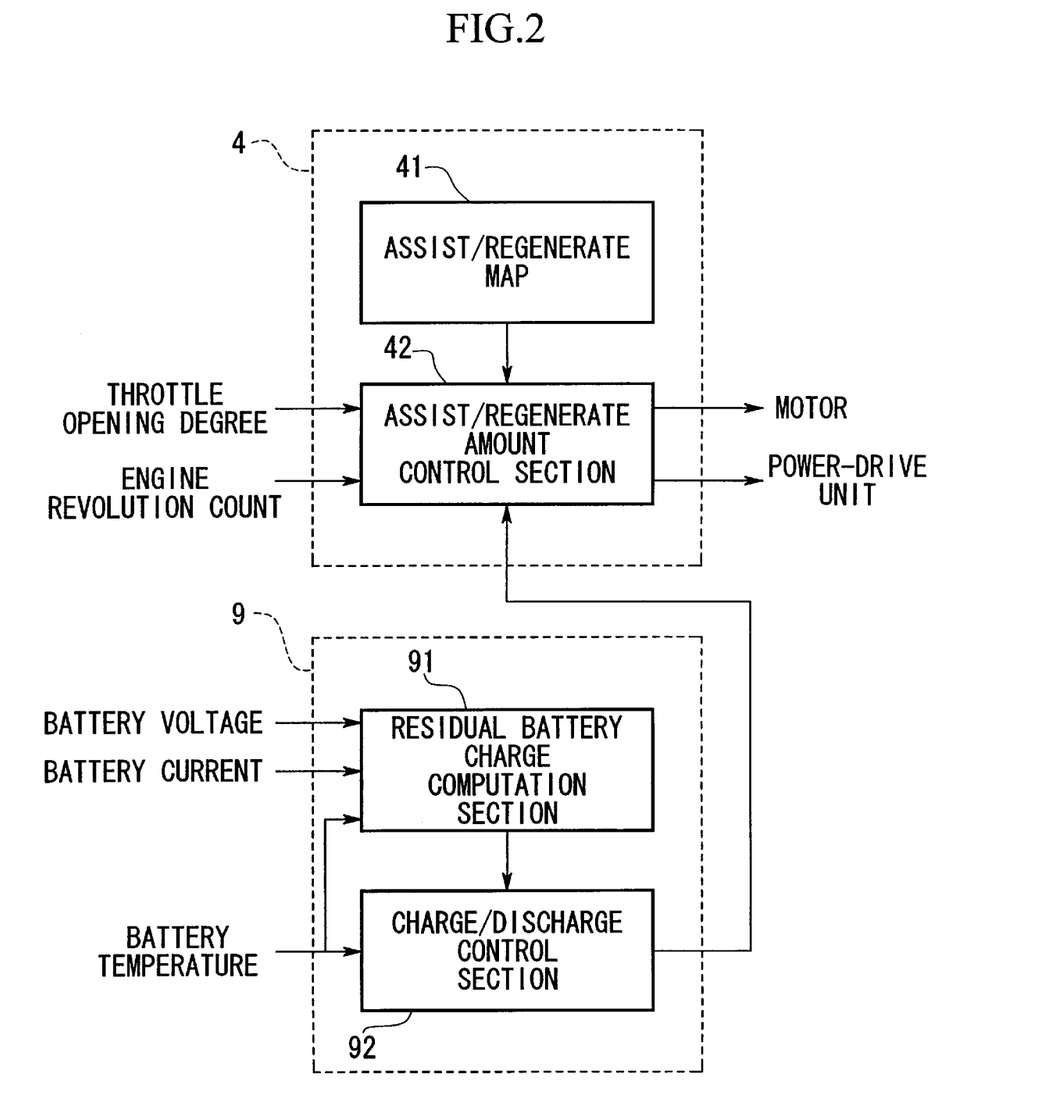
FIG. 2 is a block diagram of the motor control apparatus 4 and the battery control apparatus 9 show FIG. 1.

The construction of the motor control apparatus 4 and the battery control apparatus 9 shown in FIG. 1 will be explained with reference to FIG. 2. FIG. 2 shows a block diagram of the motor control apparatus 4 and the battery control apparatus 9 shown in FIG. 1. In this diagram, a reference numeral 41 relates to an assist/regenerate map to store control values for controlling generation or regeneration of assisting drive for engine 1. In the following presentation, the term "assist" is used to mean assisting the drive power of the engine 1, and "regenerate" means to store regenerated power generated by the regeneration operation of the motor 2. The assist/regenerate map 41 defines the values to control when to generate assisting power or when to control the regeneration operation according to the degree of opening of the throttle and the revolution speed of the engine 1.

A reference numeral 42 relates to an assist/regenerate amount control section for determining the amount of assist/regenerate actions required to control the operation of motor 2 and power drive unit 7 with reference to the assist/regenerate map; 91 relates to a residual battery charge computation section for computing the residual charge of the battery 8. The residual battery charge computation section 91 computes residual battery charge by integrating the charge/discharge current detected by the current sensor provided for the battery 8. The residual battery charge computation section 91 carries out correction (reset) of the residual battery charge computed by integrating charge/discharge current detected by the voltage sensor provided for the battery 8. Correction (reset) of residual battery charge for the battery 8 is carried out to eliminate the integration error resulting from integrating the charge/discharge current. A reference numeral 92 relates to a charge/discharge control section for determining the permissible amounts of charge/discharge according to battery temperature and residual battery charge of the battery 8 and informing the assist/regenerate amount control section 42 of the determined amounts.

The engine 1 is provided with a throttle opening degree sensor and an engine revolution sensor, which are not shown, and the output signals from these sensors are input into the motor control apparatus 4. Also, the battery 8 is provided with a voltage sensor and a temperature sensor, which are not shown, and the output signals from these sensors are input into the battery control apparatus 9.

At this point, the term "residual battery charge" of the battery 8 will be explained. Residual battery charge for battery 8 is determined by a value computed by the battery control apparatus 9 with reference to battery voltage, charge/discharge current and battery temperature and the like. The battery control apparatus 9 controls the amount of charging or discharging the battery 8 according to the computed values of the residual battery charge. Control action is divided into three regions according to the levels of residual battery charge: a charging not-permitted region; a discharging not-permitted region and a use-permitted region.

The charging not-permitted region is a region where there is a possibility of over-charging if charging is continued, and the level of residual battery charge in this region is 80~100% of the fully charged battery, for example. The discharging not-permitted region is a region where capacity can be totally exhausted by excessive drainage if discharging is continued, and the level of residual battery charge in this region is 0~20%, for example. The use-permitted region is a region where charging and discharging are both permitted, and the level of residual battery charge in this region is 20~80%, for example. The battery control apparatus 9 controls the process of charging and discharging so as to preserve the residual battery charge in the use-permitted region.

The boundary values of these regions are dependent on the characteristics of the battery used. Battery voltage and the residual battery charge are correlated such that as the battery residual charge increases the battery voltage increases. When the residual battery charge is intermediate (20~80%), changes in battery voltage is small for changes in the levels of residual battery charge, but when the residual battery charge exceeds a top threshold value (about 80%), increase in the battery voltage becomes extreme, and when the residual battery charge drops below a lowest threshold value (about 20%), decrease in the residual battery voltage becomes extreme. Therefore, residual battery charge may be estimated by detecting the phenomenon of excessively high or low battery voltage.

And, because the extent of voltage change of the battery 8 in comparison with changes in the levels of residual battery charge are small within the use-permitted region, the residual battery charge within the use-permitted region is computed by integrating the charged and discharged amounts of the battery 8. However, the method of computation using integration of current includes errors caused by current detection measurements so that the boundaries of use-permitted region cannot be detected precisely, and there is a high degree of error associated with the results of computation of residual battery charge when the battery is continually operated within the use-permitted region. For this reason, the residual battery charge computed by the method of current integration is reset (revised) using correction values so as to eliminate detection errors of residual battery charge caused by errors associated with integration of charging/discharging currents. This integration error is reset when the increase or decrease in the battery voltage becomes excessive, by revising the residual battery charge with a threshold value (in this case, 20 or 80%).

Also, the residual battery charge computation section 91 pre-stores values of the high and lower limits of battery voltage to correspond to the residual battery charge at the threshold values in a three-dimensional map, 3-D map, (not shown), constituted by three axes: voltage, battery temperature and battery discharge current. The residual battery charge computation section 91 obtains a battery voltage to correspond to the threshold values of the residual battery charge, according to the existing battery temperature and battery discharge current by referring to the 3-D map. The residual battery charge is revised according to the battery voltage thus obtained.

Figure 4:
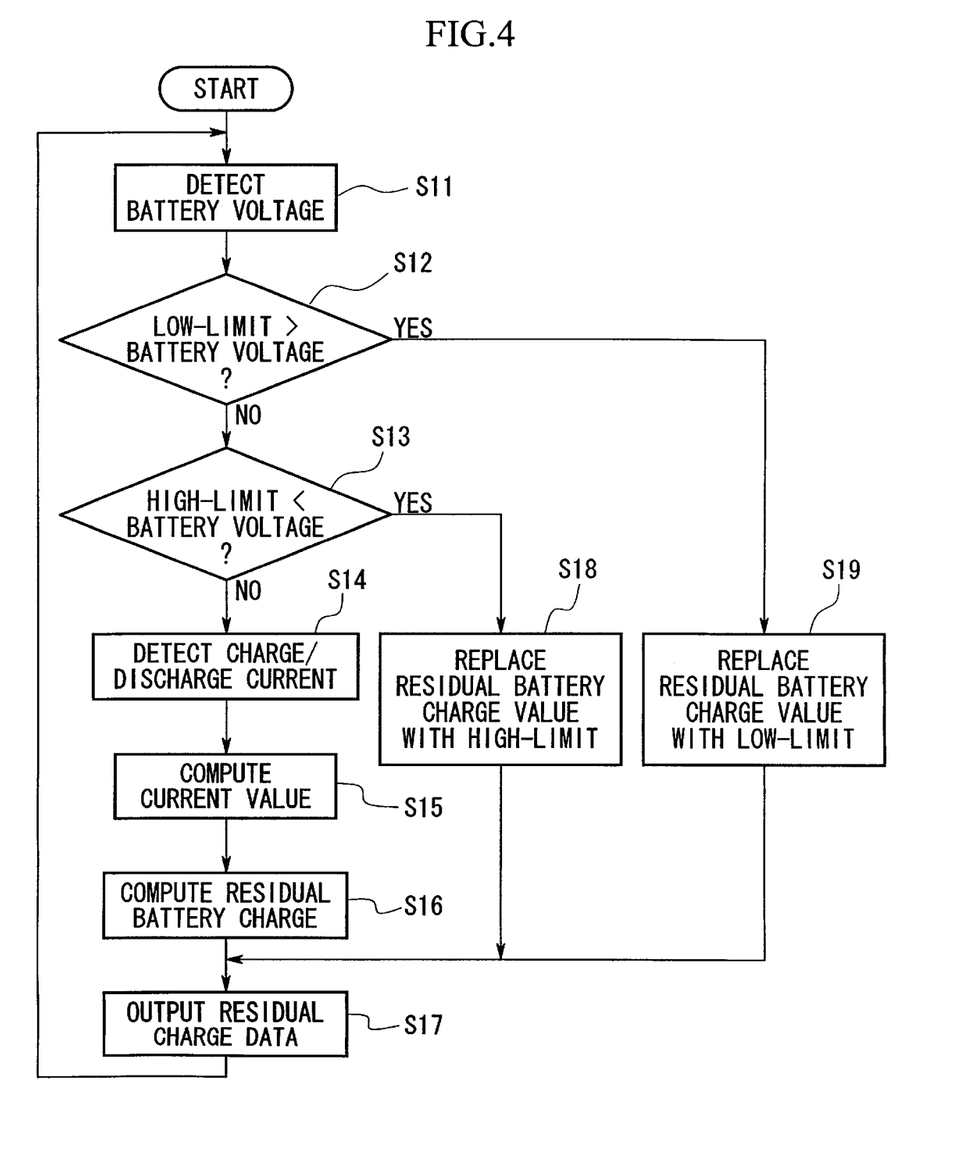
FIG. 4 is a flowchart to show the operation of the residual battery charge computation section 91 shown in FIG. 2.

The process of computing the residual charge remaining in the battery 8 will be explained with reference to FIG. 4. FIG. 4 shows a flowchart of the operation of the residual battery charge computation section 91.

First, the residual battery charge computation section 91 detects the voltage of the battery 8 (step S11). This voltage detection is performed according to output data from a voltage sensor (not shown).

Next, the residual battery charge computation section 91 determines whether the detected voltage is lower than the lower limit of battery voltage (step S12). The lower limit of battery voltage referred here is a voltage value obtained by referring to the 3-D map with axes of battery voltage, battery temperature and battery discharge current, and represents a value of the battery voltage when the residual battery charge reaches the low threshold level.

If the determination is that the detected battery voltage is higher than the lower limit of battery voltage, the residual battery charge computation section 91 then determines whether the detected battery voltage is higher than the high-limit voltage (step S13). The high-limit voltage referred here is a voltage value obtained by referring to the 3-D map with axes of battery voltage, battery temperature and battery discharge current, and represents a value of the battery voltage when the residual battery charge reaches the high threshold level.

If the determination is that the detected battery voltage is lower than the high-limit voltage, the residual battery charge computation section 91 determines charging/discharge current (step S14). The detection of charging/discharging current is carried out by using the output data from the current sensor, and detects charging current separately from the discharging current.

Next, the residual battery charge computation section 91 integrates charging/discharging current detected in step S14 (step S15). This integration process is carried out separately for charged amount and discharged amount, so that when the battery 8 is discharging, the discharged current is subtracted, but when the battery 8 is being charged, a value obtained by multiplying the detected current with a charging efficiency (0.95, for example) is added to the integral.

Next, the residual battery charge computation section 91 computes the existing residual battery charge according to the integrated value of the charging/discharging current and the initial value of the residual battery charge (step S16). Here, the initial value of the residual battery charge is stored in the residual battery charge computation section 91 and is the residual battery charge renewed for every process of FIG. 4. Further, the initial value is stored in the residual battery charge computation section 91 even when the ignition switch of the vehicle is turned off, and the stored initial value of the residual battery charge is read out when the ignition switch is turned on.

In the meantime, in step S12, if the battery voltage is less than the lower limit of battery voltage, the residual battery charge computation section 91 replaces the existing residual battery charge with the use-permitted low-limit (step S19). The use-permitted low-limit refers to the low-limit of residual charge in the use-permitted region described previously, and in this example, the value of the low-limit of residual charge is set at 20%. Accordingly, the residual battery charge is revised to the lowest limit in the use-permitted region, and the integrated value of charging/discharging current is reset.

Also, in step S13, if the battery voltage is higher than the upper-limit of battery voltage, the residual battery charge computation section 91 replaces the existing residual battery charge with the use-permitted high-limit (step S18). The of use-permitted high-limit refers to the high-limit of residual charge in the use-permitted region described previously, and in this example, the value of the high-limit of residual charge is set at 80%. Accordingly, the residual battery charge is revised to the highest value in the use-permitted region, and the integrated value of charging/discharging current is reset.

Next, the residual battery charge computation section 91 outputs the values of the residual battery charge computed or reset in step S16, S18, S19 to the charge/recharge control section 92 (step S17).

The residual battery charge computation section 91 executes the steps from step S11 to S19, shown in FIG. 4, at constant regular intervals. This constant interval is determined by the length of time required to carry out detection of battery voltage, and detection of charging/discharging current and computing a value of the integrated current.

As described above, residual battery charge of battery 8 is computed or revised by detecting the voltage of battery 8 or integrating the charging/discharging current in the residual battery charge computation section 91, and the computed result is sent to the charge/discharge control section 92. In this case, output values of residual battery charge are in a range of 20~80%. The charge/discharge control section 92 reads the residual battery charge output from the residual battery charge computation section 91, and controls charge/discharge actions according to the output value of the residual battery charge.

Figure 3:
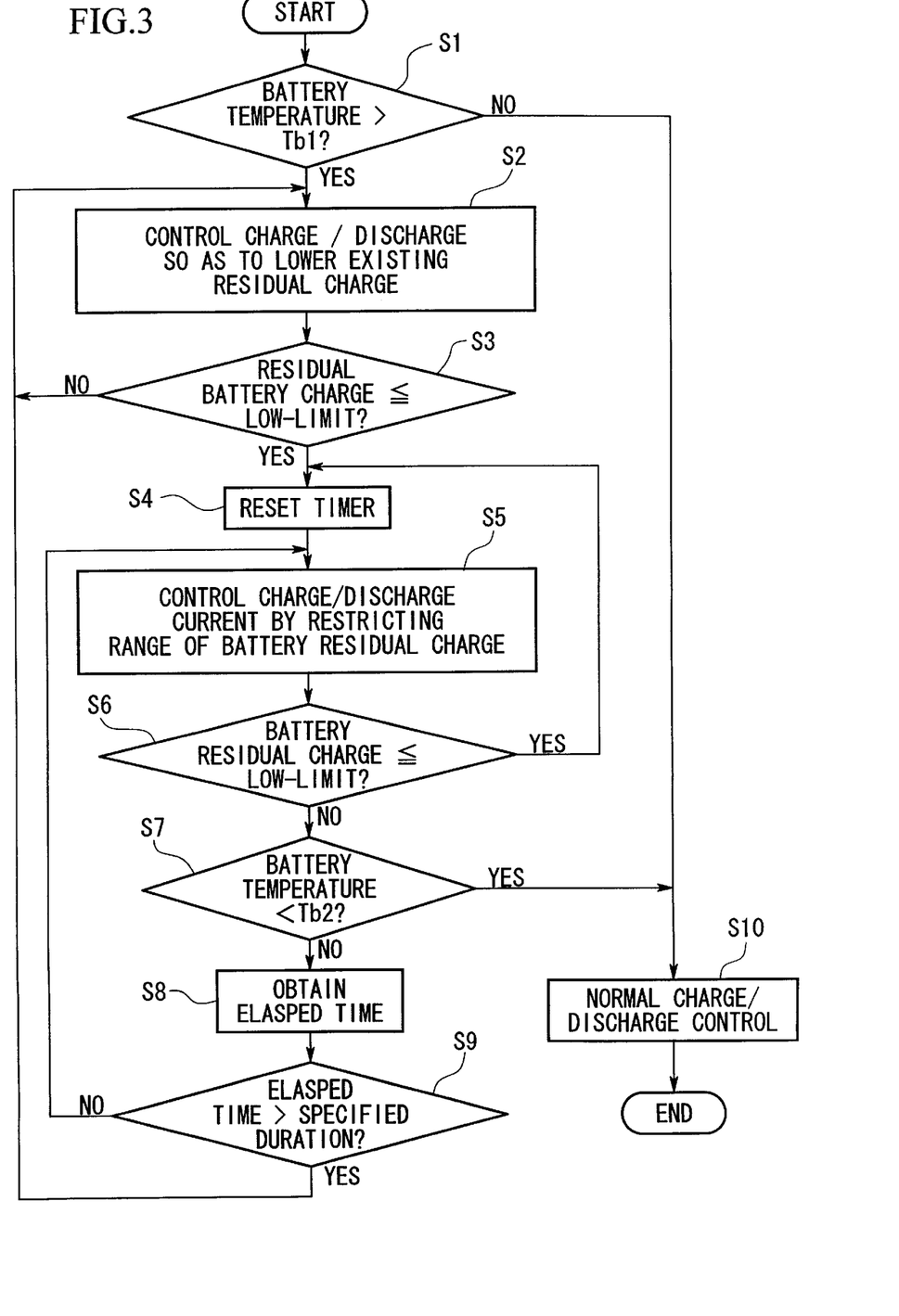
FIG. 3 is a flowchart of the process of controlling charging/discharging of the battery by the motor control apparatus 4 and the battery control apparatus 9 shown in FIG. 2.

Next, the operation of the battery control apparatus 9 shown in FIG. 2 will be explained with reference to FIG. 3. FIG. 3 shows a flowchart of the process of controlling charge/discharge action of the battery control section 9.

First, the charge/discharge control section 92 determines whether the temperature of the battery 8 is higher than a specific temperature Tb1 (50° C., for example) according to the output data of a temperature sensor (not shown) (step S1).

Figure 5:
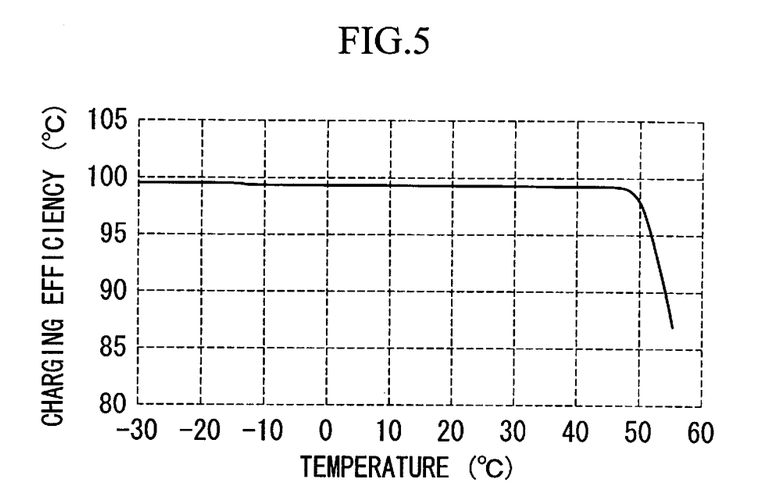
FIG. 5 is a graph to explain the charging efficiency of the battery 8.

FIG. 5 shows charging efficiency characteristics of battery 8. In FIG. 5, x-axis relates to the surface temperature of the module comprising the battery 8, and y-axis relates to charging efficiency of the battery 8. Charging efficiency refers to a ratio of attempted input of electrical energy and actually stored amount of electrical energy in the battery, and a value of 80% for the charging efficiency means that 20% of the electrical energy input into the battery 8 has been converted to heat. As shown in FIG. 5, the charging efficiency of battery 8 begins to decrease rapidly when the surface temperature of the battery 8 reaches 50° C. In this case, the temperature Tb1 is set to 50° C, but the actual value is dependent on the characteristics of the battery installed in a vehicle so that the temperature Tb1 should be determined according to the actual value.

In step S1, if the battery temperature is not higher than the regulation temperature Tb1, the charge/discharge control section 92 outputs a command to the assist/regenerate amount control section 42 to operate normal charge/discharge operation. Accordingly, the assist/regenerate amount control section 42 carries out charge/discharge operation appropriate to normal assist or regenerate process with reference to the assist/regenerate map 41 (step S10). In this case, the normal charge/discharge operation means to perform control actions in compliance with the assist/regenerate map to maintain the residual battery charge in the range of 20~80%, so that "assist" is not permitted when the residual battery charge is less than 20%, and "regenerate" is not permitted when the residual battery charge is higher than 80%.

On the other hand, if the battery temperature is higher than the regulation temperature Tb1, the charge/discharge control section 92 outputs a command to the assist/regenerate amount control section 42 to restrict the amount of charging so that the current value of the residual battery charge would be reduced (step S2). The command "to restrict the amount of charging" means to forbid regeneration, that is, to forbid any charging action. Therefore, the assist/regenerate amount control section 42 carries out the assist action only to the power drive unit 7 and the motor 2.

Next, the charge/discharge control section 92 obtains a value of the residual battery charge of the battery 8 computed in the residual battery charge computation section 91, and compares the computed value with the value of the use-permitted low-limit of the residual charge pre-stored in the charge/discharge control section 92 (step S3). Here, "the use-permitted low-limit of the residual charge" means the lowest limit of the use-permitted region described previously, and in this example, the value of the low-limit of residual battery charge is set at 20%.

If the result of the comparison indicates that the existing residual battery charge is not less than 20%, the flow returns to step S2, and repeats the process until the residual charge reaches less than 20%. By following this procedure, the residual battery charge is forced to the low-limit of use-permitted region, thereby correcting integration error caused in the current integration process.

On the other hand, if the residual battery charge is less than 20%, the charge/discharge control section 92 resets the internal timer (step S4).

Next, the charge/discharge control section 92 controls current in the charging/discharging process by restricting the range of the residual battery charge. To "restrict" means to revise the high-limit of use-permitted region described above with a restriction value that is less than the upper limit of the use-permitted region, and permit charging/discharging process to take place in a range not exceeding this revised restriction value. Because the restriction value cannot be detected by measuring the battery voltage, the process is controlled by detecting the integrated value of the charge/discharge current.

Figure 6:
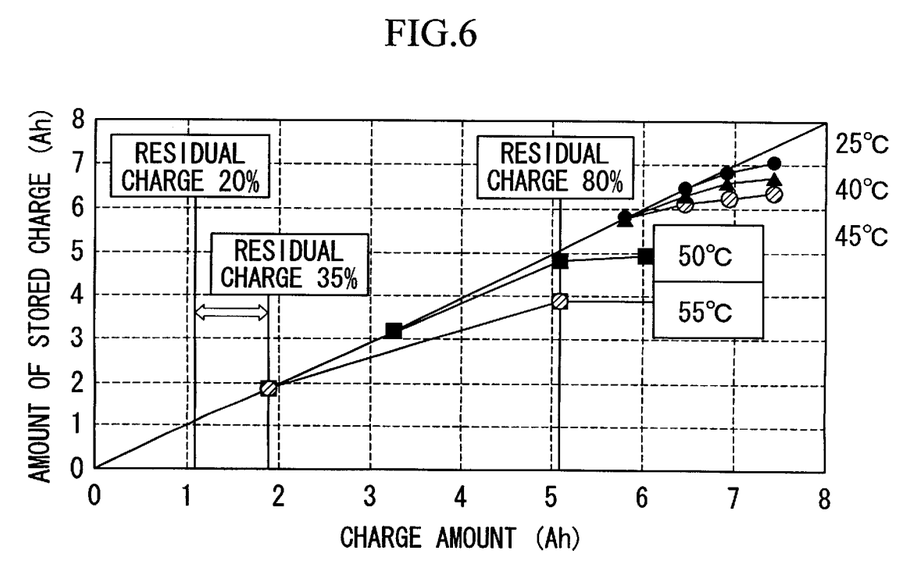
FIG. 6 is a graph to explain the temperature-dependence of charging efficiency.

This restriction value represents a high-limit of residual battery charge that enables to charge the battery without lowering the charging efficiency even when the battery temperature is high. In this example, this restriction value is set at the residual battery charge of 35%, which is termed charge-permitted high-limit. FIG. 6 shows values of the charging efficiency when the battery temperature is 25, 40, 45, 50 and 55° C. In FIG. 6, x-axis relates to the applied charge amount and y-axis relates to the actual stored amount in the battery.

It can be seen in FIG. 6 that, if the residual battery charge is in a range less than 35%, the charging efficiency does not decrease even when the battery temperature is high. Therefore, charging can be carried out efficiently without raising the battery temperature by performing charging so as not to exceed 35% residual charge until the battery temperature drops sufficiently. Also, such a procedure enables to prevent the situation from developing that makes it difficult to detect the high-limit of battery voltage corresponds to the high-limit of use-permitted region. However, the charge-permitted high-limit (35% in this example) is dependent on the characteristics of the battery to be installed in a vehicle, so that the charge-permitted high-limit should be chosen according to the nature of the battery selected.

Next, the charge/discharge control section 92 obtains a computed value of the residual battery charge in the residual battery charge computation section 91, and compares the computed value with the use-permitted low-limit of the residual charge pre-stored in the charge/discharge control section 92 (step S6). If the result of comparison determines that the residual battery charge is less than 20%, the flow returns to step S4, and again resets the internal timer.

On the other hand, if the residual battery charge is not less than 20% in step S6, the charge/discharge control section 92 determines whether the temperature of the battery 8 is less than a pre-determined regulation temperature Tb2 according to the output data from the temperature sensor (not shown) (step S7). In this example, this regulation temperature is set at 48° C. If the result the determines that the temperature is less than Tb2 (48° C.), the flow proceeds to step S10, and normal charge/discharge control is performed and the charging process is finished.

On the other hand, if the battery temperature is higher than the regulation temperature Tb2 (48° C.) in step S7, the charge/discharge control section 92 obtains an elapsed time from the internal timer (step S8), and determines whether the obtained time exceeds a pre-determined regulation time (step S9). If the result determines that the time is not exceeded, the flow returns to step S5, and the same process is repeated until the specified regulation time is reached. Here, the "regulation time" means an integration processing time required to reach a value that the integration error of the residual battery charge computed by current integration process does not exceed a pre-estimated range of integration error.

In step S9, if the elapsed time recorded by the internal timer has exceeded the regulation time, the flow returns to step S2, and repeats the process described earlier. The determination process in step S9 is performed so that the residual battery charge will be forced to the low-limit of the use-permitted region, because the integration error increases if the further integration process is continued to determine the residual battery charge.

Accordingly, in step S5, because only the current integration process is capable of detecting that the residual battery charge has reached a value of 35%, the battery is forced to discharge to the 20% level before the integration error is reset and charging/discharging is permitted to retain the residual battery charge within a desirable range (20~35% in this example). By so doing, it is possible to prevent a situation from developing that charging is accidentally continued until the residual battery charge exceeds the charge-permitted high-limit (35%) due to increase in the integration error.

It should be noted that the battery control apparatus 9 repeats the processing steps S1~S10 shown in FIG. 3.

Figure 7:
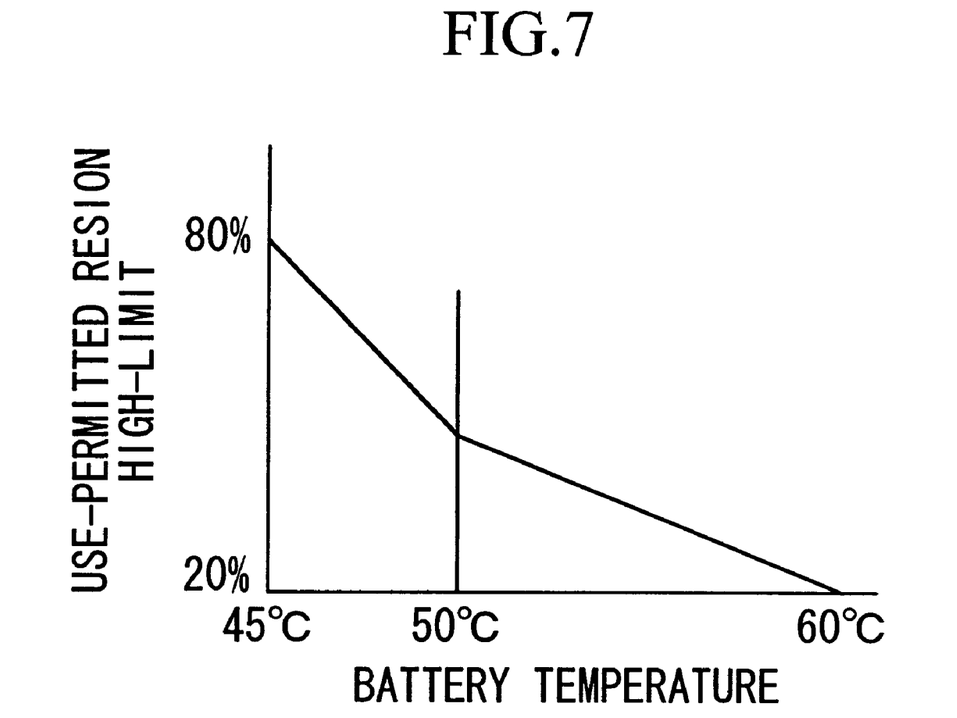
FIG. 7 is a graph to explain mapping of limiting values of permissible high-limit of use-permitted battery at different temperatures.

Also, in step S5 shown in FIG. 3, the process may be designed so that the range of residual battery charge for controlling the charging process may be determined according to the map shown in FIG. 7. The map shown in FIG. 7 defines the values of charge-permitted restriction value (35% in the foregoing example), for restricting the upper limit of the use-permitted region, for each battery temperature. This map indicates that the charge-permitted restriction value increases as the battery temperature decreases,. Also, it is permissible that the map is used to define the restriction value for restricting the low-limit of the use-permitted region.

Further, when it is desired to restrict the charging amount in step S2, instead of stopping charging completely, it is permissible to control charge/discharge process so that the charging current supplied is less than the discharging current spent in the assist action of the motor 2, resulting that the residual battery charge is allowed to drop slowly to the low-limit of residual battery charge. Alternatively, because the main battery 8 supplies the current flowing from the spare battery 11 through the downverter 10 to the electrical devices installed in the vehicle, the battery 8 may be regenerated within the existing power consumption level.

To summarize the invention, heat generation in the battery can be prevented even when the battery temperature is high, because the charging/discharging process is carried out so as to limit the residual battery charge to remain in a suitable low range to avoid charging the battery in a region of low charging efficiency. Also, it is possible to reduce variations in the battery capacity among the modules comprising the battery.

Also, it is possible to eliminate the integration error in the computed residual battery charge, because, when it is detected that the battery has reached a high temperature, only discharging is permitted until the battery is discharged to the low-limit of the use-permitted region.

Further, it is possible to prevent accidental over-charging of the battery caused by using the upper limit of the use-permitted region which is difficult to detect from the battery voltage, because the process is designed by restricting the upper limit of the use-permitted region when the battery temperature is high.

What is claimed is:

1. An apparatus for controlling a battery installed in a hybrid vehicle having a combustion engine for providing a driving force, an electric motor for generating a drive-assist force for assisting the output of the engine, wherein said battery supplies electrical power to the motor, and, when the drive-assist force is not required by the engine, said motor is used as a generator to charged the battery, said apparatus is comprised by:

a residual battery charge computation device for computing a level of residual battery charge in the battery;

a battery temperature measuring device for measuring a temperature of the battery; and a charge/discharge controller that operates in such a way that, when a battery temperature measured by the battery temperature measuring device exceeds a threshold temperature, said charge/discharge controller permits only discharging until the residual battery charge is lowered to a level defined by a first specified value.

2. An apparatus according to claim 1, wherein, after said battery reaches said first specified value of residual battery charge, said charge/discharge controller permits the battery to be charged a level not exceeding a level defined by a second specified value of the residual battery charge, which is higher than said first specified value of the residual battery charge.

3. An apparatus according to one of claim 1 or 2, wherein the residual battery charge computation device determines whether a battery voltage is at a low-limit of the battery voltage, and defines a detected low-limit of battery voltage as representing the use-permitted low-limit of the residual battery charge.

* * * * *